US008129871B2

(12) United States Patent
Huang

(10) Patent No.: US 8,129,871 B2

(45) Date of Patent: Mar. 6, 2012

(54) ELECTROMAGNETIC VIBRATOR AND PRODUCING METHOD THEREOF

(76) Inventor: Hsin Min Huang, Ningbo (CN)

( * ) Notice: Subject to any disclaimer, the term of this patent is extended or adjusted under 35 U.S.C. 154(b) by 597 days.

(21) Appl. No.: 12/308,675

(22) PCT Filed: Sep. 29, 2007

(86) PCT No.: PCT/CN2007/002854

§ 371 (c)(1),
(2), (4) Date: Dec. 17, 2008

(87) PCT Pub. No.: WO2008/037183

PCT Pub. Date: Apr. 3, 2008

(65) Prior Publication Data

US 2011/0169349 A1 Jul. 14, 2011

(30) Foreign Application Priority Data

Sep. 30, 2006 (CN) .......................... 2006 1 0053729

(51) Int. Cl.
*H02K 33/00* (2006.01)
*H02K 35/00* (2006.01)

(52) U.S. Cl. ............. 310/28; 381/423; 381/326; 310/15

(58) Field of Classification Search .................... 310/28, 310/15; 381/423, 326
See application file for complete search history.

(56) References Cited

U.S. PATENT DOCUMENTS

| | | | | |
|---|---|---|---|---|
| 4,584,439 | A * | 4/1986 | Paddock | 381/89 |
| 5,408,533 | A * | 4/1995 | Reiffin | 381/96 |
| 5,430,805 | A * | 7/1995 | Stevenson et al. | 381/408 |
| 5,703,337 | A * | 12/1997 | Geisenberger | 181/206 |
| 6,278,787 | B1 * | 8/2001 | Azima | 381/152 |
| 6,925,191 | B2 * | 8/2005 | Petroff et al. | 381/423 |
| 7,088,838 | B2 * | 8/2006 | Rye et al. | 381/336 |
| 2004/0022409 | A1 * | 2/2004 | Hutt et al. | 381/423 |
| 2004/0165746 | A1 * | 8/2004 | Kreitmeier et al. | 381/398 |
| 2004/0202343 | A1 * | 10/2004 | Rye et al. | 381/353 |
| 2005/0078850 | A1 * | 4/2005 | Norton | 381/423 |
| 2005/0111689 | A1 * | 5/2005 | True | 381/423 |
| 2005/0135651 | A1 * | 6/2005 | Hakansson | 381/396 |
| 2005/0185809 | A1 * | 8/2005 | Bianchini | 381/190 |
| 2005/0185816 | A1 * | 8/2005 | Roark et al. | 381/400 |
| 2005/0207612 | A1 * | 9/2005 | D'Hoogh | 381/423 |
| 2006/0062421 | A1 * | 3/2006 | Kuribayashi et al. | 381/424 |
| 2007/0071274 | A1 * | 3/2007 | Andersen et al. | 381/404 |
| 2007/0081693 | A1 * | 4/2007 | Andersen et al. | 381/423 |
| 2010/0092023 | A1 * | 4/2010 | Bryant et al. | 381/397 |

FOREIGN PATENT DOCUMENTS

| | | | |
|---|---|---|---|
| CN | 2372796 Y | * | 4/2000 |
| CN | 1794883 A | * | 6/2006 |

* cited by examiner

*Primary Examiner* — Quyen Leung

*Assistant Examiner* — Alex W Mok

(74) *Attorney, Agent, or Firm* — Raymond Y. Chan; David and Raymond Patent Firm

(57) ABSTRACT

An electromagnetic vibrator is composed of vibration sheet, suspension edge, basin frame and magnetic return path system. The electromagnetic vibrator is prepared as connecting back surface of vibration sheet to voice coil being set in magnetic return path system, injecting the vibration sheet and suspension edge to be an integral unit, connecting suspension edge with basin frame by ultrasonic mode and connecting vice coil wire to terminal sheet on basin frame after the wire is connected by vibration sheet.

18 Claims, 3 Drawing Sheets

ELECTROMAGNETIC VIBRATOR AND PRODUCING METHOD THEREOF

BACKGROUND OF THE PRESENT INVENTION

1. Field of Invention

The present invention relates to a device using electromagnetic effect to generate vibration, and more particularly to an electromagnetic vibrator and a producing method having a similar structure of the electromagnetic vibrator of the current using speakers.

2. Description of Related Arts

An electromagnetic vibrator, taught by China patent CN2328129, published on Jul. 7, 1999, comprises a core, an armature, a coil, a resonance spring, a holder or a link fork, and a vibration body or a feeding groove. The electromagnetic vibration is generated by supplying current through the coil. But this type of vibrator has a large size, the vibration frequency is low, the frequency range is small, the efficiency is low and can not sufficiently transform the electrical energy into mechanical energy. The usage of this type of vibrator is limited, especially when high frequency is required.

The existing speaker comprises a vibration sheet, a suspension edge, a basin frame, and a magnetic loop system. The vibration sheet is attached with the suspension edge via glue. The suspension edge is also attached with the frame via glue. The amount of the glue will affect the mass of the vibration sheet which is a critic factor of the speaker's quality. In the point of chemistry, generally the glue is using van der Waals force or Hydrogen bond instead of chemical bond, so the reliability is always a problem. During time, the elements will be peeled off due to oxidization of the glue. Such a product needs several processes of gluing, performed manually. The process is complex, difficult to maintain the consistency and stability, so as to the quality of the product. The application of the product is limited.

SUMMARY OF THE PRESENT INVENTION

The main object of the present invention is to provide an electromagnetic vibrator to overcome the disadvantage of current using technology. Based on the vibration principle and construct of speakers, the present invention improves the structure and production process, to achieve a stable natural frequency and a high efficiency, as well as a simplified structure and high stability.

The present invention also provides a process of manufacture of an electromagnetic vibrator, which is easy to perform, the product passing rate and consistency is high.

Accordingly, in order to accomplish the above objects, the present invention provides an electromagnetic vibrator, comprising a vibration sheet, a suspension edge, a basin frame, and a magnetic loop system, wherein the back of the vibration sheet is connected with the voice coil. The voice coil is positioned within the magnetic loop system. The vibration sheet is integrated with the suspension edge. The voice coil wire is connected with the vibration sheet, and further connected with the terminal sheet on the basin frame.

The vibration sheet can be formed by injection molding. Conductive sheet can also be embedded inside the vibration sheet. Voice coil wire is connected with the conductive sheet, and then connected with the terminal sheet on the basin frame through a conductive wire in order to increase the weight of the vibration sheet, to make the connection easy, and to provide the required frequency.

The conductive sheet can be formed in a round shape, for adding weight. Otherwise the conductive sheet can be formed in two pieces to form a single round shape, and performed as two poles respectively.

The magnetic loop system is similar to the structure of speakers. When a sine wave is inputted, the vibrator will vibrate. When a sine wave with a fixed frequency is inputted, and such frequency equals to the resonance frequency of the vibratory, the amplitude could be very large even with limited input energy.

The present invention also provides a method to fabricate the electromagnetic vibrator, comprising the following steps.

(1) Injection mold a vibration sheet.

(2) Integrate the vibration sheet with the suspension edge by injection.

(3) Connect the suspension edge with the basin frame by ultrasonic mode.

(4) Connect the back side of the vibration sheet with the voice coil by glue, and connect the voice coil wire with the conductive wire through the vibration sheet, wherein the other end of the conductive wire is connected with the terminal sheet of the basin frame.

(5) Affix the magnetic loop system in the basin frame.

To ensure the right frequency of the vibrator, the most important step is to control the weight of the vibration sheet. The step of injection molding the vibration sheet, and integrating the vibration sheet with the suspension edge by injection can enable the consistency of the weight to ensure the quality of the vibration sheet.

In step (2), since the vibration sheet needs to be small in size but still has a particular amount of weight, a conductive sheet is embedded therein which is coated with a layer of plastic material for insulation. Then using a special mold, at the time of injecting the suspension edge by the injector, the suspension edge and the vibration sheet are formed integrally.

The conductive sheet can be two separated pieces aligned together to form a single round shape, or an integral round shape. The material of the conductive sheet could be copper, tinned aluminum, or PCB plate, for the purposes of conducting and adding weight.

Comparing to current technique, the present invention has the following the advantages.

The electromagnetic vibrator is improved from the construct and principle of speakers, the construct is simple, the size is flexible. It is easy to obtain stable natural frequency, and high efficiency, and suitable for mass production.

Because the process is using injection molding machine instead of glue, it can guaranty the consistency and stability of the mass of the vibration sheet. The connection of the basin frame is using ultrasonic mode instead of glue. The amount of glue applied directly affects the resonance frequency of the vibrator. There is always error in the process of applying glue no matter apply manually or by machine. Also, glue will be oxidized after time to cause peeling off. Therefore, the present invention overcomes the disadvantage of conventional technique by using glue. The quality and passing rate are increased, the cost is reduced.

The present invention uses the embedded conductive sheet to adjust the weight of the vibration sheet, and consequently to adjust the resonance frequency. Therefore, the frequency is very easy to be the same as the frequency of the AC power supply so as to resonate. With a very small amount of energy, such as a very low voltage supplied, the vibrator will vibrate severely with the maximum amplitude, to generate the maximum vibration energy.

There are many advantages such as adjustable dimension, high efficiency, high performance reliability, high consistency, and low cost of the present invention, it can be widely used in many fields including speakers.

These and other objectives, features, and advantages of the present invention will become apparent from the following detailed description, the accompanying drawings, and the appended claims.

DETAILED DESCRIPTION OF THE PREFERRED EMBODIMENT

Figure 1:
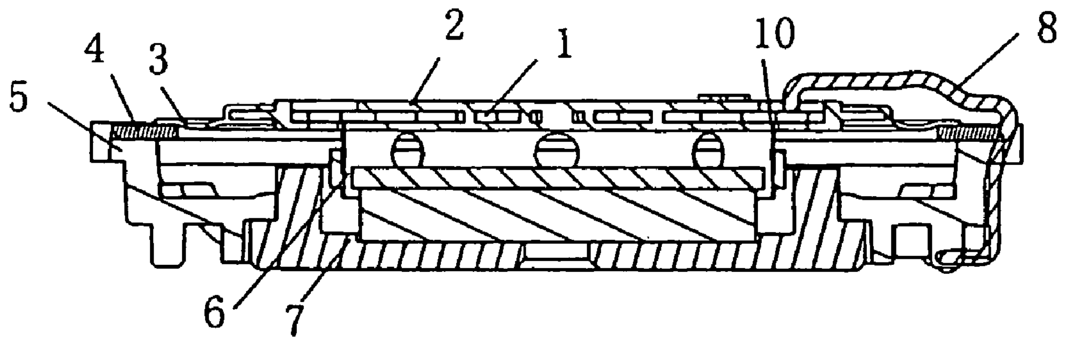
FIG. 1 is a sectional schematic view of an electromagnetic vibrator according to a preferred embodiment of the present invention.
Figure 3:
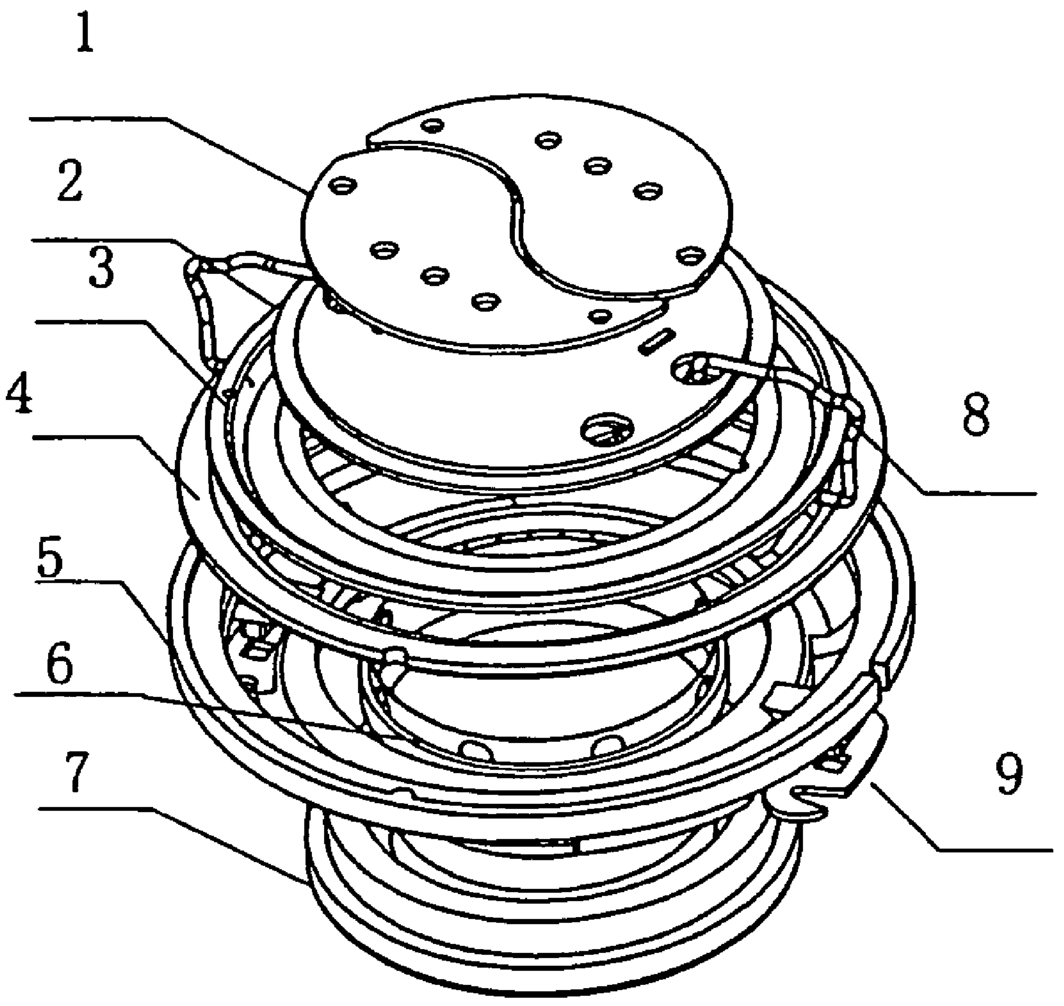
FIG. 3 is an exploded perspective view of the electromagnetic vibrator according to the above preferred embodiment of the present invention.
Figure 4:
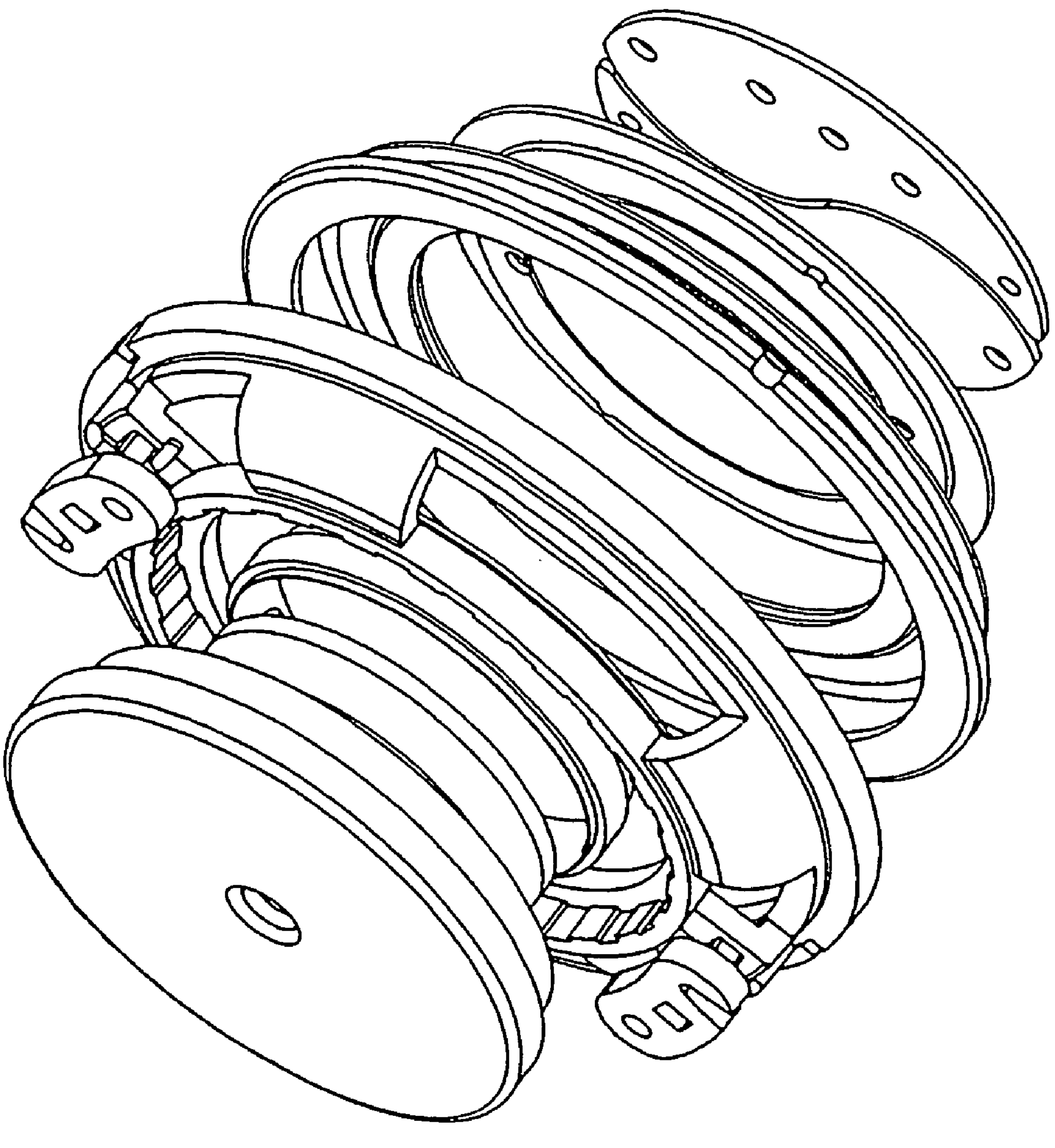
FIG. 4 is another exploded perspective view of the electromagnetic vibrator according to the above preferred embodiment of the present invention.

Referring to FIGS. 1, 3 and 4, an electromagnetic vibrator according to a preferred embodiment of the present invention is illustrated, wherein the electromagnetic vibrator comprises a vibration sheet 2, a suspension edge 3, a basin frame 5, and a magnetic loop system 7. The vibration sheet 2 comprises two conductive sheets 1 sealed therewithin, wherein the two conductive sheets 1 are spaced apart from each other and are aligned to form a round shape. The vibration sheet 2 is connected with the suspension edge 3 first, and then connected with a gasket 4, and then connected with the whole basin frame 5. The lower edge of the suspension edge 3 is connected with a voice coil 6. The other end of the voice coil 6 is suspended over the permanent magnet of the magnetic loop system 7, wherein the permanent magnet of the magnetic loop system 7 is formed as a one piece magnetic vibration provider for providing a magnetic field. The magnetic loop system 7 is affixed within the basin frame 5.

The conductive sheets 1 are connected with the connection racks located on two sides of the basin frame 5 though conductive wires 8 respectively. The conductive sheets 1 are also connected with the voice coil 6 through voice coil wire 10.

The electromagnetic vibrator is fabricated with the method comprising the following steps.

(1) Injection molding a vibration sheet 2.

(2) Embed the conductive sheets 1 into the vibration sheet 2 by injection.

(3) Integrate the vibration sheet 2 with the suspension edge 3 by injection.

(4) Connect the suspension edge 3 of the vibration sheet 2 with the basin frame 5 by ultrasonic connection.

(5) Connect the back of the vibration sheet 2 with the voice coil 6 by glue, and connect the voice coil wire 10 with the conductive wire 8 through the vibration sheet 2, wherein the other end of the conductive wire 8 is connected with the terminal sheet 9 of the basin frame 5 to integrally form a one piece vibration body for generating vibration of the vibration sheet 2 in responsive to the magnetic field.

(6) Affix the magnetic loop system 7 in the basin frame 5.

Figure 2:
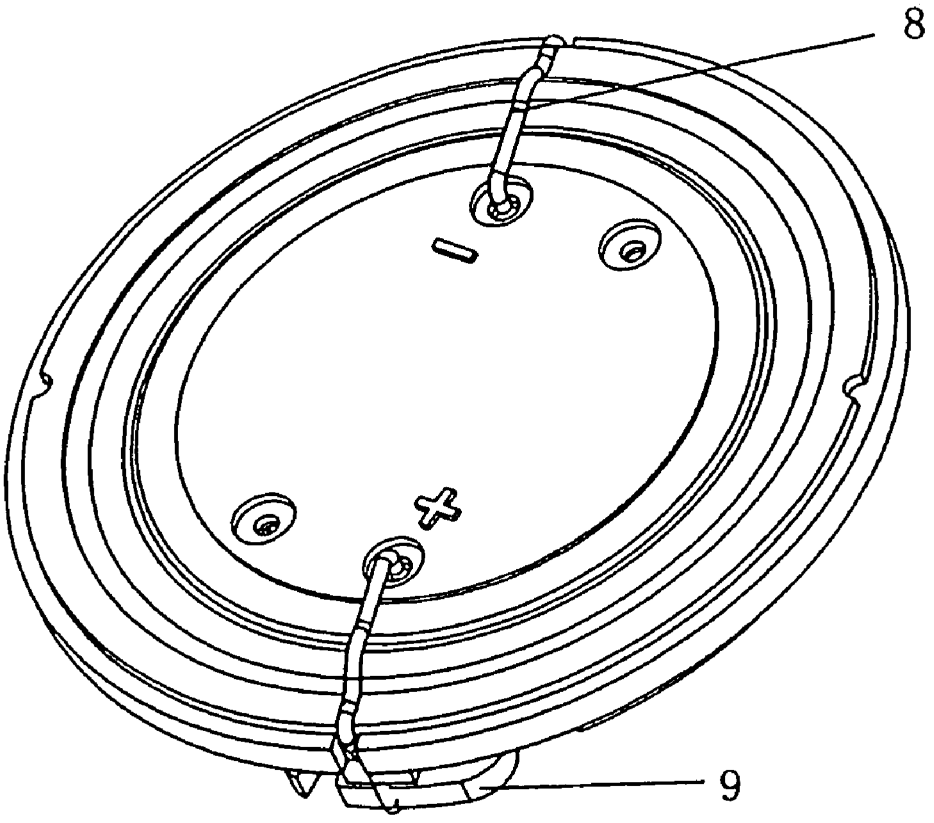
FIG. 2 is a perspective view of the electromagnetic vibrator according to the above preferred embodiment of the present invention.

FIG. 2 illustrates the embodiment of electromagnetic vibrator fabricated by the above method.

In step (4), the suspension edge 3 of the vibration sheet 2 can also be integrally formed with the gasket 4 together, and then connected with the basin frame 5 by ultrasonic connection to prevent the unwanted shift of the vibration sheet 2, and to connect accurately.

The vibration sheet 2 can be formed by injecting molding directly, or by embedding the conductive sheets 1 into the vibration sheet 2 via injection. The conductive sheet 1 could be two pieces spacedly aligned to form a round shape. The material of the conductive sheet 1 could be copper, tinned aluminum, or PCB plate, for the purposes of conducting and adding weight. The conductive sheet 1 is coated with a plastic layer (such as PP) for insulation, and is embedded into the vibration sheet 2. Then using a special mold, at the time of injecting the suspension edge 3 by the injector, the suspension edge 3 and the vibration sheet 2 are formed integrally. In other words, the conductive sheets 1, the vibration sheet 2, the suspension edge 3, the gasket 4, the basin frame 5, the voice coil 6 are integrally formed in one piece vibration body. Therefore, the vibration body is coupled with the magnetic vibration provider to magnetically communicate the voice coil 6 with the permanent magnet of the magnetic loop system 7.

The conductive sheet 1 could be metal sheet, such as copper and tinned aluminum, or PCB material.

The two relative conductive sheets 1 are aligned in "S" shape, (Tai Chi or yin-yang shape), in order to prevent the conductive sheets 1 from being tilted in different levels at the planar direction during resonant vibration. The tilted conductive sheets 1 will affect the quality of the vibrator.

The conductive sheets 1 can increase the weight of the vibration sheet 2, adjust the resonance frequency for resonate with the input AC current. It also acts as the conductive media for the voice coil wire 10 of the voice coil 6 for the current input.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electromagnetic vibrator, comprising a vibration sheet, a suspension edge, a basin frame, and a magnetic loop system, a back side of said vibration sheet being connected with a voice coil, said voice coil being positioned within said magnetic loop system, said vibration sheet integrated with said suspension edge by injection molding, said suspension edge being connected with said basin frame by ultrasonic mode, a voice coil wire being connected with said vibration sheet and further connected with a terminal sheet on said basin frame.

2. The electromagnetic vibrator, as recited in claim 1, further comprising a gasket positioned between said suspension edge and said basin frame, wherein said vibration sheet and said suspension edge are connected together by injection.

3. The electromagnetic vibrator, as in claim 2, furthering comprising a conductive sheet embedded in said vibration sheet by injection, wherein said voice coil is connected with said conductive sheet by a wire, and is then connected with said terminal sheet on said basin frame.

4. The electromagnetic vibrator, as recited in claim 3, wherein said conductive sheet is made of metal or PCB material.

5. The electromagnetic vibrator, as in claim 4, wherein said conductive sheet is isolated into two spaced apart pieces within said vibration sheet.

6. The electromagnetic vibrator, as recited in claim 5, wherein said conductive sheet is in "S" shape.

7. The electromagnetic vibrator, as in claim 3, wherein said conductive sheet is isolated into two spaced apart pieces within said vibration sheet.

8. The electromagnetic vibrator, as recited in claim 7, wherein said conductive sheet is in "S" shape.

9. The electromagnetic vibrator, as in claim 1, further comprising a conductive sheet embedded in said vibration sheet by injection, wherein said voice coil is connected with said conductive sheet by a wire, and is then connected with said terminal sheet on said basin frame.

10. The electromagnetic vibrator, as recited in claim 9, wherein said conductive sheet is made of metal or PCB material.

11. The electromagnetic vibrator, as in claim 10, wherein said conductive sheet is isolated into two spaced apart pieces within said vibration sheet.

12. The electromagnetic vibrator, as recited in claim 11, wherein said conductive sheet is in "S" shape.

13. The electromagnetic vibrator, as in claim 9, wherein said conductive sheet is isolated into two spaced apart pieces within said vibration sheet.

14. The electromagnetic vibrator, as recite in claim 13, wherein said conductive sheet is in "S" shape.

15. A method of manufacturing an electromagnetic vibrator, comprising the steps of:
- (a) injection molding a vibration sheet;
- (b) integrating said vibration sheet with a suspension edge by injection;
- (c) connecting said suspension edge with a basin frame by ultrasonic mode;
- (d) connecting a back side of said vibration sheet with a voice coil by glue, and connecting a voice coil wire with a conductive wire through said vibration sheet, wherein another end of said conductive wire is connected with a terminal sheet of said basin frame; and
- (e) affixing a magnetic loop system in said basin frame.

16. The method as recited in claim 15 wherein, in the step (b), a conductive sheet is embedded in said vibration sheet by injection, wherein said vibration sheet, said suspension edge and a gasket are formed integrally by injection.

17. The method, as in claim 16, wherein in the step (c) said vibration sheet and said basin frame are connected by ultrasonic mode.

18. The method, as in claim 15, wherein in the step (c) said vibration sheet and said basin frame are connected by ultrasonic mode.

* * * * *